(12) United States Patent
Wilson

(10) Patent No.: US 6,824,582 B2
(45) Date of Patent: Nov. 30, 2004

(54) FILTER SYSTEM FOR TURBINE ENGINE

(75) Inventor: Joseph Wilson, Florissant, MO (US)

(73) Assignee: Westar Corporation, St. Charles, MO (US)

( * ) Notice: Subject to any disclaimer, the term of this patent is extended or adjusted under 35 U.S.C. 154(b) by 0 days.

(21) Appl. No.: 10/319,124

(22) Filed: Dec. 13, 2002

(65) Prior Publication Data

US 2004/0112020 A1 Jun. 17, 2004

(51) Int. Cl.$^7$ .............................................. B01D 46/24
(52) U.S. Cl. ........................ 55/385.3; 55/471; 55/480; 55/481; 55/493; 55/498; 55/502
(58) Field of Search ................................ 55/306, 385.1, 55/385.3, 467, 471, 480, 481, 486, 487, 493, 497, 498, 502–505, 510

(56) References Cited

U.S. PATENT DOCUMENTS

| | | | |
|---|---|---|---|
| 2,708,920 A | * | 5/1955 | Pasturczak .............. 123/198 E |
| 2,728,411 A | * | 12/1955 | Pasturczak ................. 55/315.1 |
| 2,928,497 A | | 3/1960 | Stockdale |
| 2,976,558 A | * | 3/1961 | Fain .......................... 15/312.1 |
| 3,001,606 A | * | 9/1961 | Bierwirth et al. ............. 55/471 |
| 3,247,652 A | * | 4/1966 | Annas et al. ................. 55/481 |
| 3,319,402 A | | 5/1967 | Ritchie |
| 3,402,881 A | | 9/1968 | Moore et al. |
| 3,421,296 A | | 1/1969 | Beurer, Sr. |
| 3,449,891 A | | 6/1969 | Shohet et al. |
| 3,483,676 A | | 12/1969 | Sargisson |
| 3,617,149 A | * | 11/1971 | Gibson .......................... 415/91 |
| 3,686,837 A | | 8/1972 | Hopkins et al. |
| 3,811,254 A | | 5/1974 | Amelio |
| 4,149,689 A | * | 4/1979 | McDonald ................ 244/53 B |
| 4,158,449 A | | 6/1979 | Sun et al. |
| 4,222,755 A | * | 9/1980 | Grotto ......................... 55/291 |
| 4,261,168 A | * | 4/1981 | Grigorian et al. ......... 60/39.092 |
| 4,290,889 A | | 9/1981 | Erickson |
| 4,299,603 A | * | 11/1981 | Friesen ......................... 55/290 |
| 4,314,831 A | * | 2/1982 | Barbic ....................... 55/385.1 |
| 4,369,728 A | | 1/1983 | Nelson |
| 4,445,456 A | | 5/1984 | Nelson |
| 4,478,216 A | * | 10/1984 | Dukowski .............. 128/204.21 |
| 4,619,674 A | * | 10/1986 | Erdmannsdorfer ........... 55/486 |
| 4,704,143 A | * | 11/1987 | Percy .......................... 96/421 |
| 4,761,166 A | * | 8/1988 | Kitchener et al. .......... 55/385.1 |
| 4,917,202 A | * | 4/1990 | Glover et al. .............. 180/68.3 |
| 5,049,172 A | | 9/1991 | Shary et al. |
| 5,125,940 A | * | 6/1992 | Stanhope et al. ........... 55/385.3 |
| 5,411,224 A | * | 5/1995 | Dearman et al. ......... 244/53 B |
| 5,662,292 A | | 9/1997 | Greene et al. |
| 5,888,261 A | * | 3/1999 | Fortune ....................... 55/400 |
| 6,059,851 A | * | 5/2000 | DePietro et al. ........... 55/385.3 |
| 6,179,890 B1 | * | 1/2001 | Ramos et al. ................ 55/482 |
| 6,193,772 B1 | * | 2/2001 | Wiefel ........................ 55/283 |
| 6,298,819 B1 | * | 10/2001 | Johnson et al. .......... 123/198 E |
| 6,303,192 B1 | * | 10/2001 | Annapragada et al. ....... 427/527 |
| 6,319,304 B1 | * | 11/2001 | Moredock .................... 95/269 |
| 6,348,085 B1 | * | 2/2002 | Tokar et al. .................. 95/286 |
| 6,475,255 B1 | * | 11/2002 | Walker, Jr. ................... 55/315 |
| 6,598,384 B1 | * | 7/2003 | Adkins .................... 60/39.092 |

FOREIGN PATENT DOCUMENTS

| | | | |
|---|---|---|---|
| GB | 2084897 A | * | 4/1982 |
| WO | WO 97/49608 | | 12/1997 |

* cited by examiner

Primary Examiner—Robert H. Spitzer
(74) Attorney, Agent, or Firm—Senniger Powers

(57) ABSTRACT

An air induction system for an engine to remove contaminants from intake air prior to delivery to the engine. The system includes a filter formed of a filter media arranged in a generally annular shape for placement around a portion of the engine to receive intake air from an annular region surrounding the engine. A filter mount is engageable with an outer surface of the engine and configured for supporting the filter at an installed position wherein the filter is in spaced relation from the outer surface of the engine. The filter is constructed for easy installation and removal.

17 Claims, 9 Drawing Sheets

FILTER SYSTEM FOR TURBINE ENGINE

BACKGROUND OF THE INVENTION

This invention relates generally to air intakes for engines, and in particular to a barrier filter which protects an engine providing auxiliary power to an aircraft. An auxiliary power unit (APU) is a self-contained engine and generator system capable of producing electrical and/or pneumatic power for an aircraft, primarily while on the ground and typically while the main engines are not running. Although an APU can be mounted on a portable ground cart at an airport, it is more frequently mounted onboard the aircraft in an internal cavity. Typically, the cavity has tightly limited space constraints which restrict accessibility to perform maintenance tasks on the APU.

The APU requires intake air that is free from contaminants to provide for efficient combustion and avoid internal damage. The compressor and turbine are designed with small tolerances between moving parts which maximize efficiency, but which also increase vulnerability to damage from small contaminant particles. Contamination of intake air, even in a small amount, causes premature wear on engine components, increases maintenance costs, and degrades operational reliability. Unfortunately, aircraft are exposed to contaminants when operating at low altitudes where intake air is frequently contaminated with material from the ground, such as sand and dust. That problem is aggravated for helicopters due to rotor downwash and prolonged low-altitude operation.

The air inlet of many types of APUs is cylindrically shaped and covered with a mesh. It draws air from within the aircraft's internal cavity over substantially an entire 360 degree periphery surrounding the APU for low pressure drop and highly efficient operation. It prevents large debris, such as leaves, from entering the engine. However, it is ineffective at blocking sand and dust. The position of the inlet in the limited space constraints of the internal cavity has prevented application of an effective filter or particle separating system. Such a system is difficult to install in a manner which seals around the inlet so that all incoming air is filtered, and which permits air to approach from substantially the full periphery for low pressure drop. Aggravating the difficulty is that the system must be accessible for installation, maintenance, and/or removal. Moreover, components of the APU, such as the accessory drive, oil pump, temperature sensors, fuel lines, and/or generator, form obstructions to freely installing or accessing any filter around the inlet.

SUMMARY OF THE INVENTION

Among the several objects and features of the present invention that may be noted the provision of an engine intake air filtration system which effectively removes contaminants; the provision of such a system which is usable in conjunction with an existing aircraft APU for installation in a cavity of tightly limited space constraints; the provision of such a system which draws air from substantially a full periphery around the APU; the provision of such a system which is readily accessible for maintenance; the provision of such a system which is adaptable to facilitate installation around various obstructions on the APU; the provision of such a system which is lightweight; and the provision of such a system which is economical.

In general, an air induction system of the present invention is for an engine to receive intake air from a region generally surrounding the engine, remove contaminants from the intake air, and provide the intake air for delivery to the engine. The engine includes a housing having an outer peripheral surface. The system comprises a filter formed of a filter media arranged in a generally annular shape for placement around a portion of the engine to receive intake air from the region generally surrounding the engine. A filter mount is engageable with the outer surface of the engine and configured for supporting the filter at an installed position wherein the filter is in spaced relation from the outer surface of the engine. The mount has an inner edge shaped and sized for sealingly engaging the engine and has an outer edge configured for sealingly engaging and supporting the filter.

In another aspect, a combination of the present invention includes an engine with an air induction system for protecting the engine from contaminant particles and which is readily installed or removed for facilitating rapid replacement such as for maintenance. The combination comprises an engine having a housing with an outer surface and a generally cylindric inlet. A filter formed of a filter media is arranged in a generally annular shape for placement around the inlet to receive intake air from the region generally surrounding the engine. The filter comprises at least two separable filter units. A filter mount is engageable with the engine and configured for supporting the filter at an installed position wherein the filter is spaced from the inlet. The mount has an inner edge shaped and sized for sealingly engaging the outer surface and having an outer edge configured for sealingly engaging and supporting the filter.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
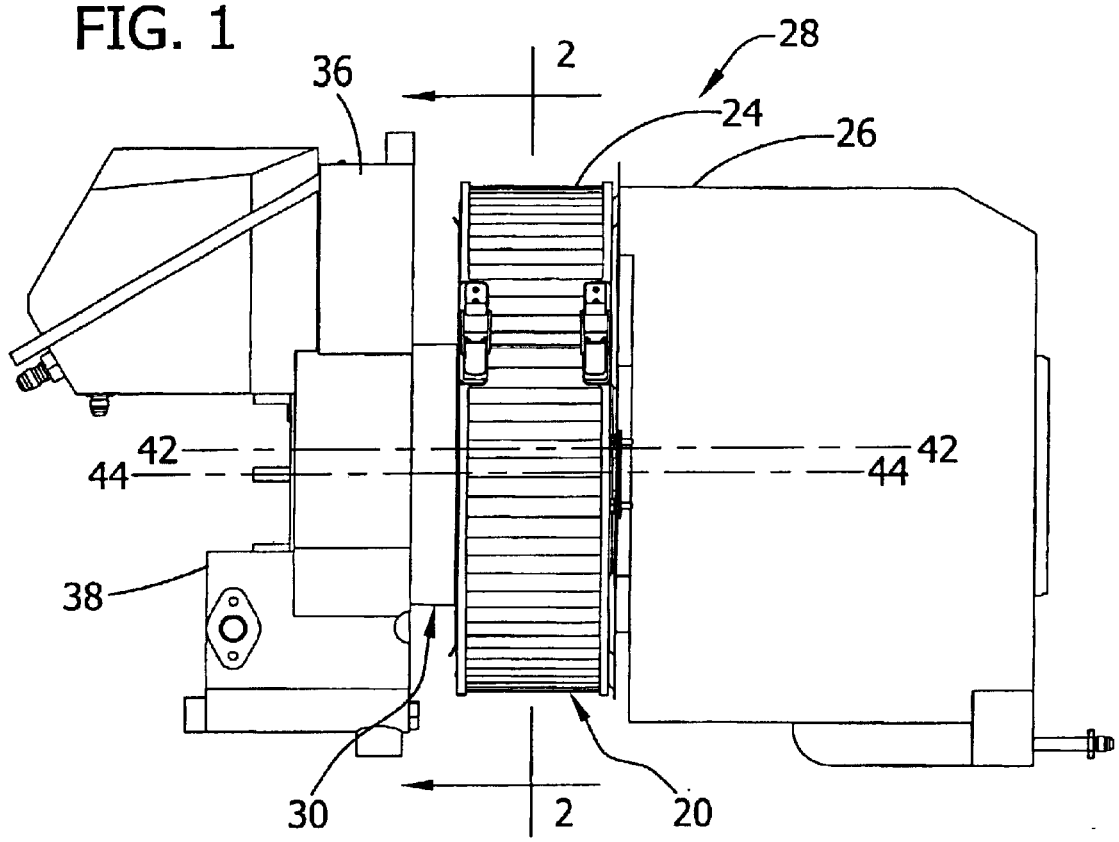
FIG. 1 is an elevation of a first APU having an air induction system according to the present invention.

Referring now to the drawings and in particular to FIG. 1, an air induction system of the present invention is designated generally by 20. The system 20 includes a filter mount 22 and a filter 24 configured for protecting an engine 26 from ingestion of contaminant particles. The system 20 is primarily intended for use with a gas turbine engine of an auxiliary power unit 28 (APU) which is installed in an aircraft, such as a helicopter (not shown). However, it is understood that the system can be used with other types of air-breathing engines and with installation at any facility, such as at a factory or on a portable cart, without departing from the scope of this invention.

Figure 10:
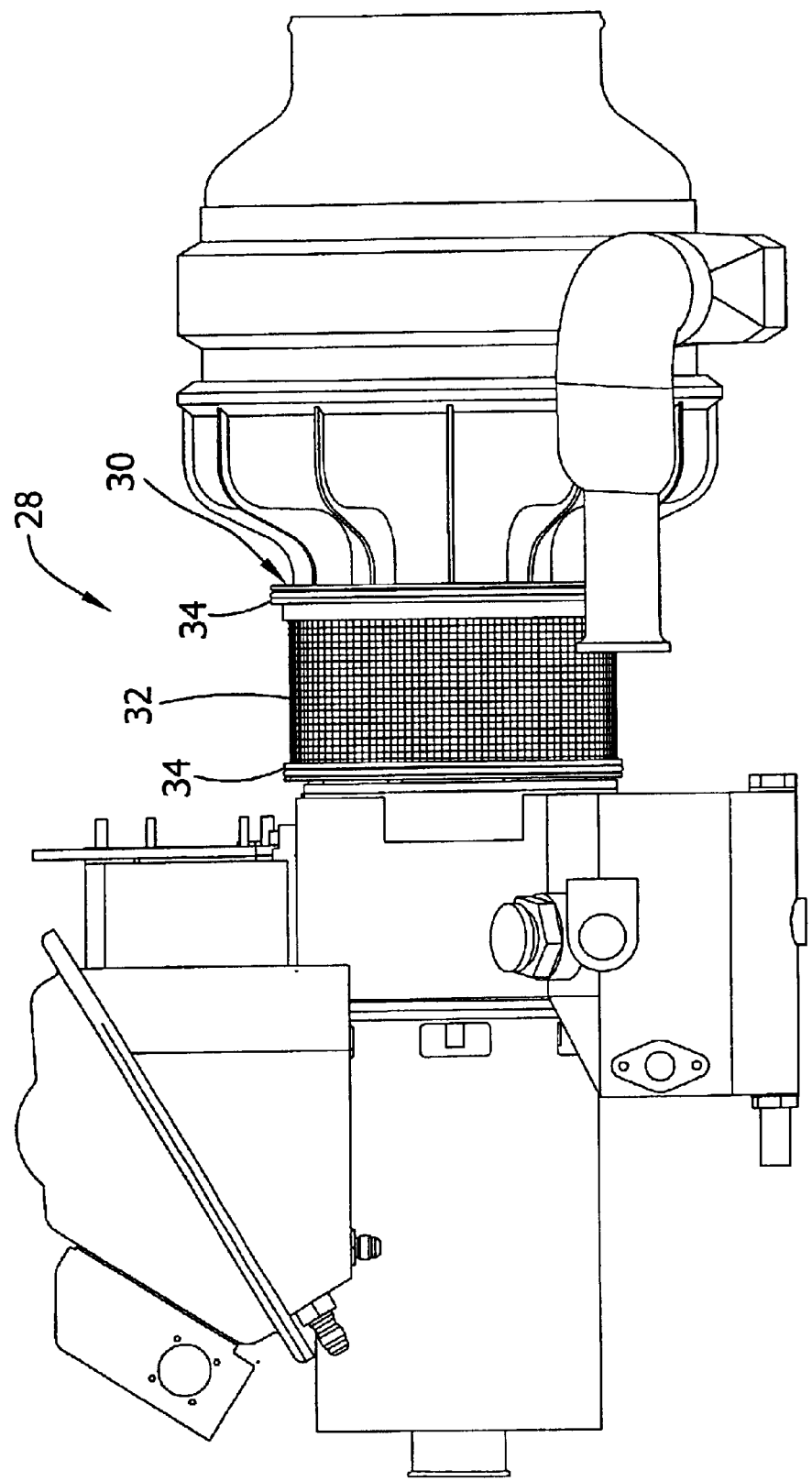
FIG. 10 is an elevation of a second APU prior to installation of an air induction system of the first embodiment.

The engine 26 of the APU includes a housing 30 having an outer peripheral surface, said surface including an inlet 32 for receiving intake air for delivery to the engine. For most types of APUs, the inlet 32 (shown in section in FIG. 2) is a porous mesh, or screen (FIGS. 2 and 10), which permits flow of air while preventing passage of large debris, such as leaves. The inlet 32 is generally cylindric in shape and is fixedly attached in position between two disk-shaped end walls 34 at a central location of the APU. It draws intake air from an annular region generally surrounding the APU 28. As known to those skilled in the art, the APU 28 also includes various other components including a fuel control assembly 36 and accessory drive assembly 38.

Figure 2:
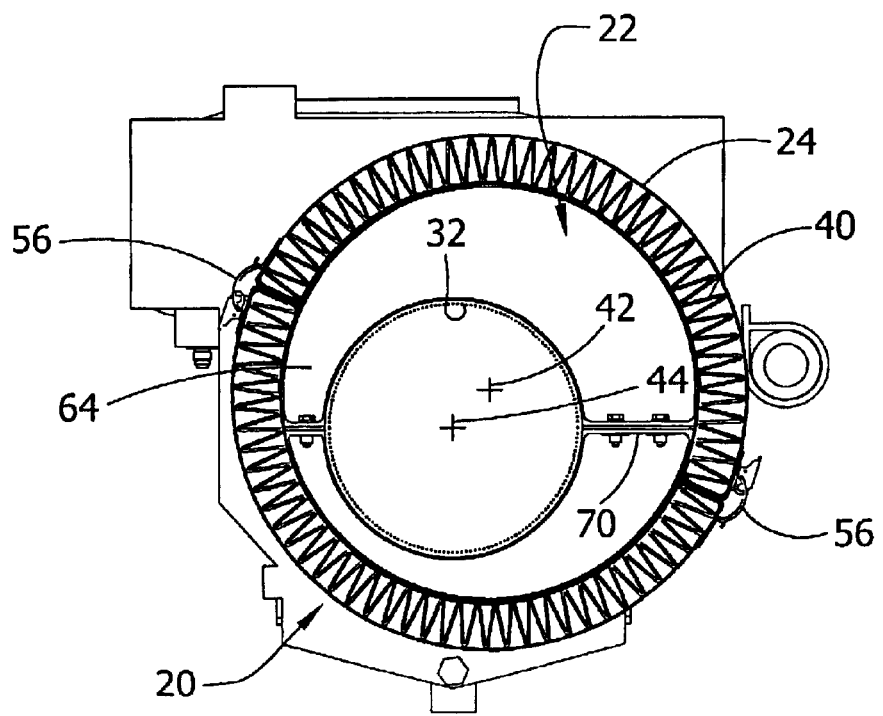
FIG. 2 is a section taken on line 2—2 of FIG. 1.
Figure 3:
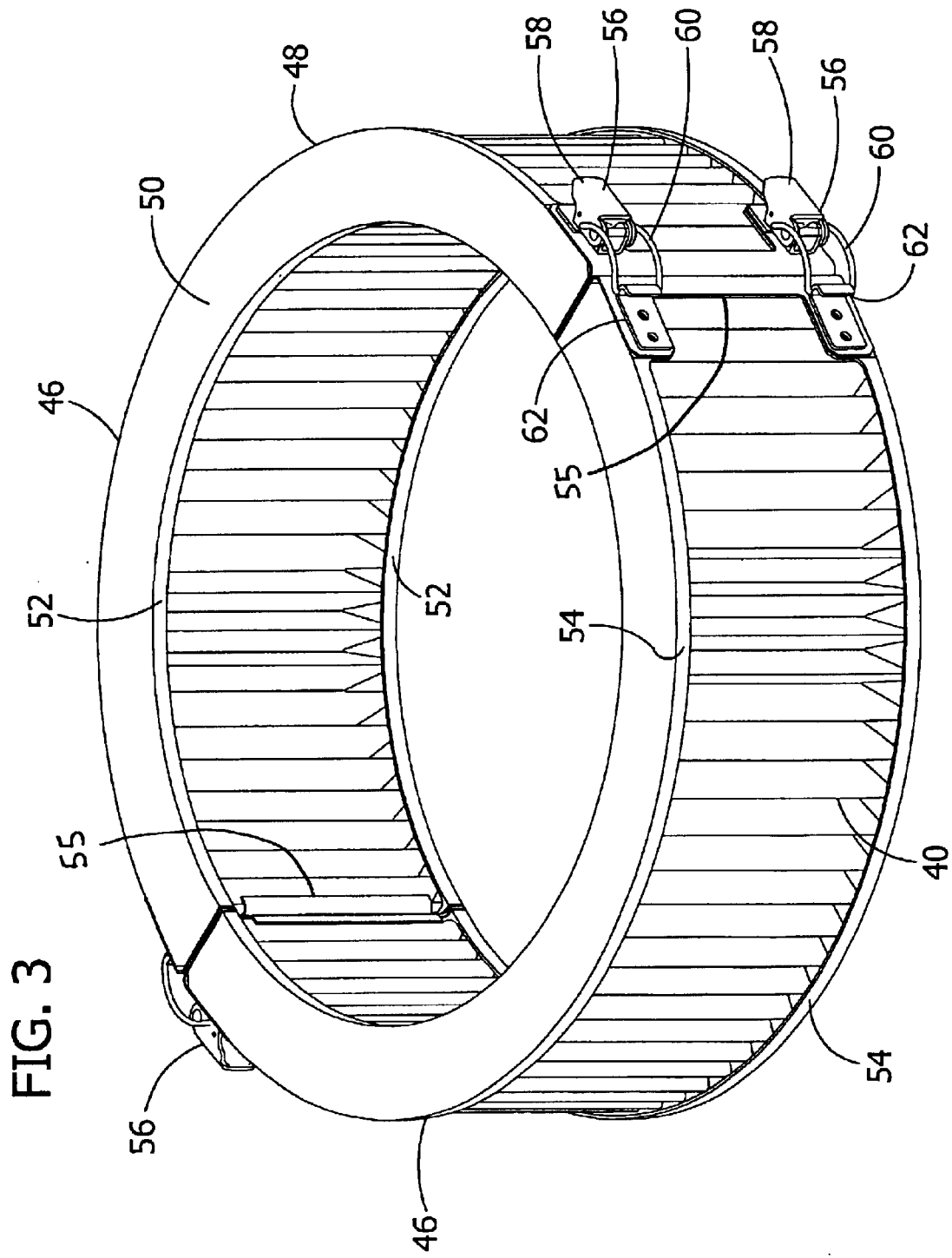
FIG. 3 is a perspective of an annular filter of the air induction system.

Referring to FIGS. 2 and 3, the filter 24 of the present invention is formed of a pleated barrier filter media 40 arranged in an annular shape for placement around a portion of the engine, preferably although not necessarily around the inlet 32. At an installed position (FIG. 2), the filter 24 is secured to the engine 26 and spaced from the inlet 32. As shown in FIGS. 1 and 2, the filter 24 has a central longitudinal axis 42 which is parallel and offset both horizontally and vertically from a longitudinal axis 44 of the engine and its inlet 32. As discussed below, the offset can be selected so that the filter 24 has clearance from various components of the APU 28.

The filter 24 includes first and second filter elements, or half filter units 46, each half filter being generally semicircular in shape. Preferably, the first and second half filters 46 are substantially the same such that they are interchangeably usable in the system 20. That permits reduction in the number of parts required and avoids the difficulties of left and right handed parts installation. It is understood that filters of various other shapes and configurations, such as non-pleated filters, filters formed with a number of component parts other than two, and use with non-cylindric or non-screened inlets, do not depart from the scope of this invention.

A semicircular portion of the filter media 40 is mounted in each half filter 46 within a semicircular retention frame 48 which securely retains the respective portion in place, yet allows for its easy replacement. The frame 48 includes a face 50 (FIG. 3), an inner rim 52, and an outer rim 54, with a face on the opposite side of the frame spaced from and connected to the face 50 by member 55. The frame captures the filter media portion in the manner of a picture frame. An exemplary material for the frame 48 is aluminum, although the particular structure of the frame may vary by the type of APU and its specific design and configuration. The filter media 40 is held in place in the frame 48 by a suitable adhesion or physical connection, such as by a conventional polymeric potting material such as polysulphite or polyurethane, or by an epoxy. The potting material functions as a sealant to seal the perimeter (i.e., side edges) of the filter media 40, structurally adhering it to the frame 48 and preventing unfiltered air from passing between the frame and the filter media. Each filter half 46 is constructed such that if it should become covered with contaminants to a degree where adequate airflow can not be provided to the engine, maintenance personnel can readily clean the barrier filter media.

Interengageable fasteners 56 are positioned on outer peripheries of the first and second half filters 46 for interconnecting the half filters at the installed position. The filter halves 46 are engageable with the mount 22 and securable at the installed position with said fasteners 56 between the filter halves, and being free from fixed attachment to the mount or the engine to thereby facilitate rapid installation and removal. In the preferred embodiment, the fasteners 56 comprise latch clips which are quickly attachable and detachable. The latch clips include pivotable latches 58 connected to wire connectors 60 which are received in hooks 62 mounted on an opposite half filter. Engaging the wire connectors 60 with the hooks 62 and pivoting the latches 58 closed pulls adjoining ends of the semicircular portions of the frame 48 into close contacting relation.

Pleating of the barrier filter media 40 effectively increases the surface area and rigidity of the filter media. The filter media 40 is effective at separating contaminants from the air and provides a low pressure drop characteristic across the filter 24. In one embodiment, the filter media 40 is constructed so that the filter 24 will achieve a particle removal efficiency of at least about 96%, preferably at least about 98%, of the AC Coarse dust particles and at least about 95%, preferably at least about 97%, of the AC Fine dust particles. As known in the art, AC Coarse (defined in Society of Automotive Engineers (SAE) J726 Air Cleaner Test Code) dust has particle sizes ranging from 0 to 200 microns and mean diameter of about 80 microns. AC Fine dust has particle sizes ranging from 0 to 80 microns and mean diameter of about 8 microns.

The filter media 40 is comprised of material capable of achieving the aforementioned AC Coarse test dust and AC Fine test dust particle removal efficiencies. The filter media 40 is made of a lightweight material that will also be resistant to damage by water and other liquids it may encounter in operation. Preferred filter media includes woven cotton or polyester or a felt. When cotton is employed as the filter media, the filter media is preferably a cotton grid fabric comprised of a plurality of overlapping layers of woven cotton material. Preferably, the number of layers is in the range of from 3 to 6. The filter media 40 may be strengthened by a porous stainless steel screen (not shown) which covers the filter media on both sides. To improve the filter efficiency for finer particles, the filter media 40 is preferably impregnated with oil, which not only improves particle removal, but also helps resist moisture absorption by the filter media rendering it waterproof.

Significantly, the filter 24 is supported at an installed position (FIG. 2) wherein the filter is radially spaced from the outer surface of the engine 26 (e.g., from the inlet 32). That facilitates clearance from existing APU components and minimal need to relocate these items when installing a filter. It also permits a favorable configuration for airflow as the intake air passes through the filter 24 and into the inlet 32, requiring less severe flow turning angles, reduced turbulence, and lower pressure drop than a comparable non-spaced system. Further, because primary attachment loads are not carried through the filter 24, but rather through the mount 22, it permits the filter to have a more lightweight design and facilitates rapid installation and removal.

Figure 4:
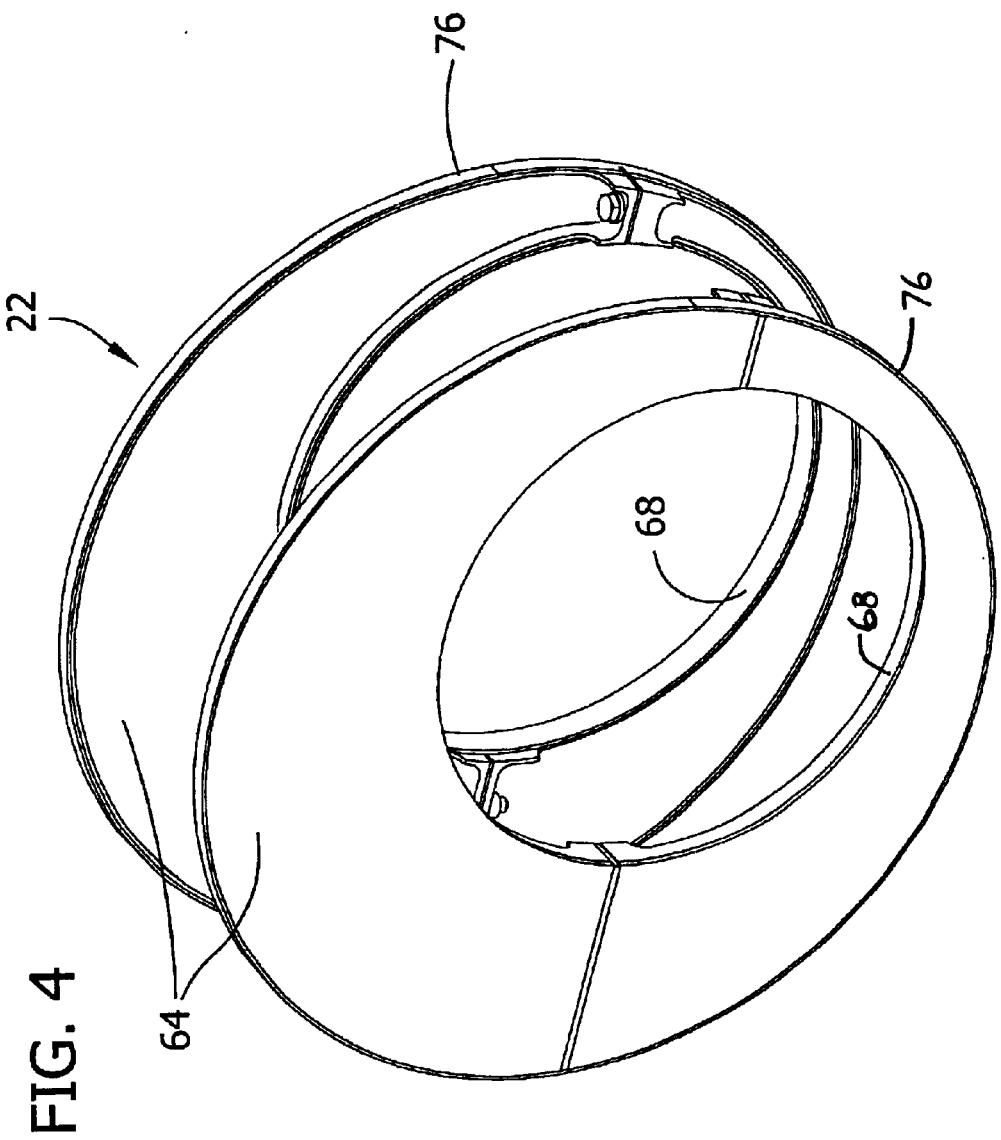
FIG. 4 is a perspective of a mount comprising two plates for mounting the filter on the APU.

The filter mount 22 is engageable with the engine 26 or other component of the APU 28 and is configured for supporting the filter 24 at the installed position. The mount 22 comprises first and second plates 64 (FIG. 4) attachable to the engine 26 in parallel spaced relation. Each plate 64 has an inner edge shaped and sized for engaging the engine 26. The inner edge preferably conforms to a contour of the outer surface of the engine and forms a generally airtight seal thereagainst. Ideally, the APU 28 has generally circular end walls 34 (FIG. 10) which are adjacent to the inlet 32. These walls 34 provide engagement surfaces for the inner edge of the plates 64. However, the geometries of the inner edge and other areas of the plate can be altered as needed to any shape to fit the specific design requirements of any existing APU. In this way, the plates 64 are designed to adapt as needed so that the filter 24 may be effectively installed on a variety of APUs.

Figure 5:
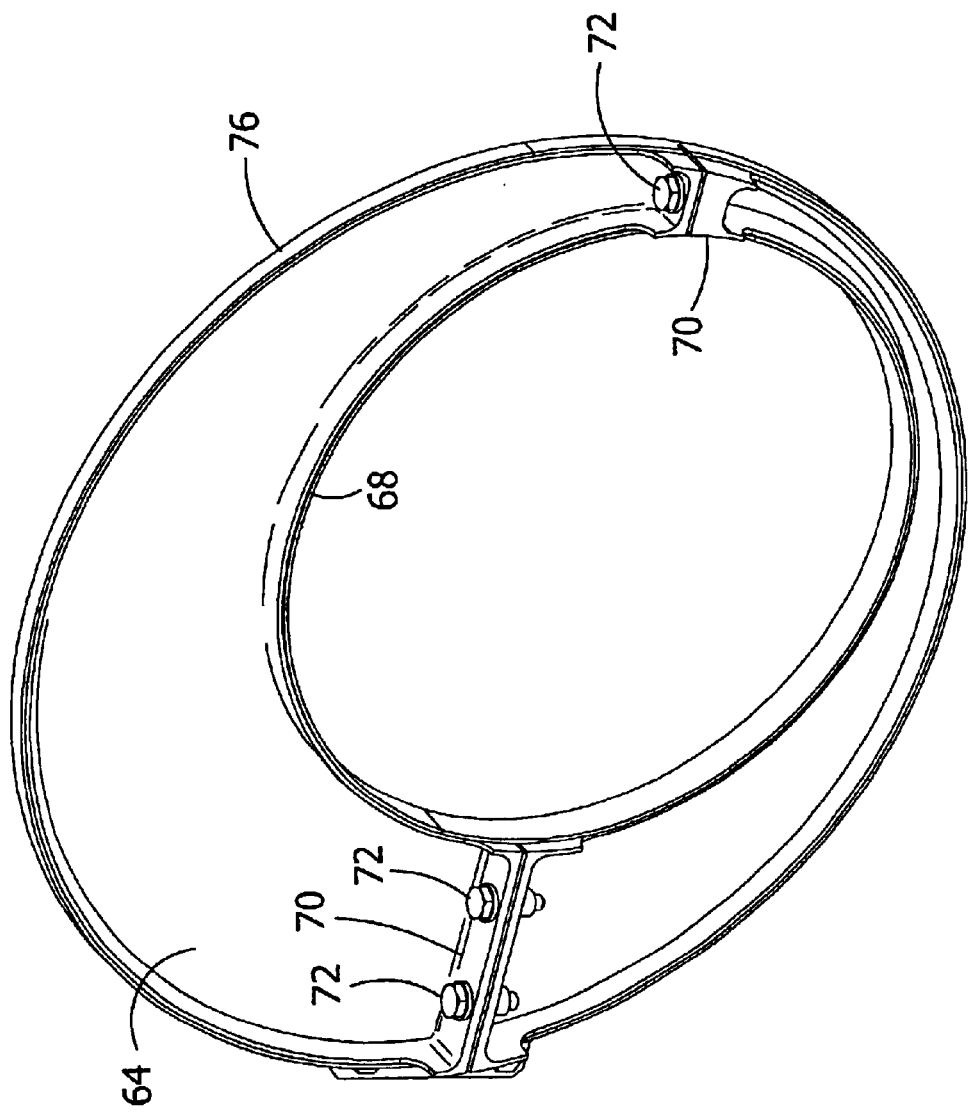
FIG. 5 is a backside perspective of one of the plates of FIG. 4.

A seal 68 (FIG. 5) of a suitable resilient material preferably extends along the inner edge to provide an airtight engagement. In the preferred embodiment, the seal 68 is a 0.060 inch thick strip of silicone rubber which is attached to the plate 64 by a suitable method such as by an adhesive. Each plate 64 is constructed in two halves with attachment flanges 70 (FIG. 5) for receiving fasteners 72 to attach the halves together and thereby secure the plate 64 to the engine. The plates 64 are formed of a suitable rigid and lightweight material, such as aluminum.

Each plate 64 has an outer peripheral edge configured for supporting the filter 24. The outer edge conforms to a contour of the filter and preferably includes a seal 76 extending along the outer edge to provide an airtight seal. In the preferred embodiment, the seal 76 is a 0.060 inch thick strip of silicone rubber. When the filter 24 is placed on the plate 64, the inner rim 52 of the frame 48 engages the edge (more specifically, the seal 76) and forms a generally airtight seal thereagainst. Other shapes and forms of filter mounts, including mounts other than plates, do not depart from the scope of this invention.

At the installed position, the filter 24 spans the plates 64. The circular shape of the filter 24 allows air pressure and attachment forces to distribute evenly around the filter for effective sealing. The frame 48 of the filter engages the outer edges of the plates 64, forming a substantially airtight enclosure around the inlet 32 such that all air must pass through the filter media 40 to reach the inlet.

Figure 11:
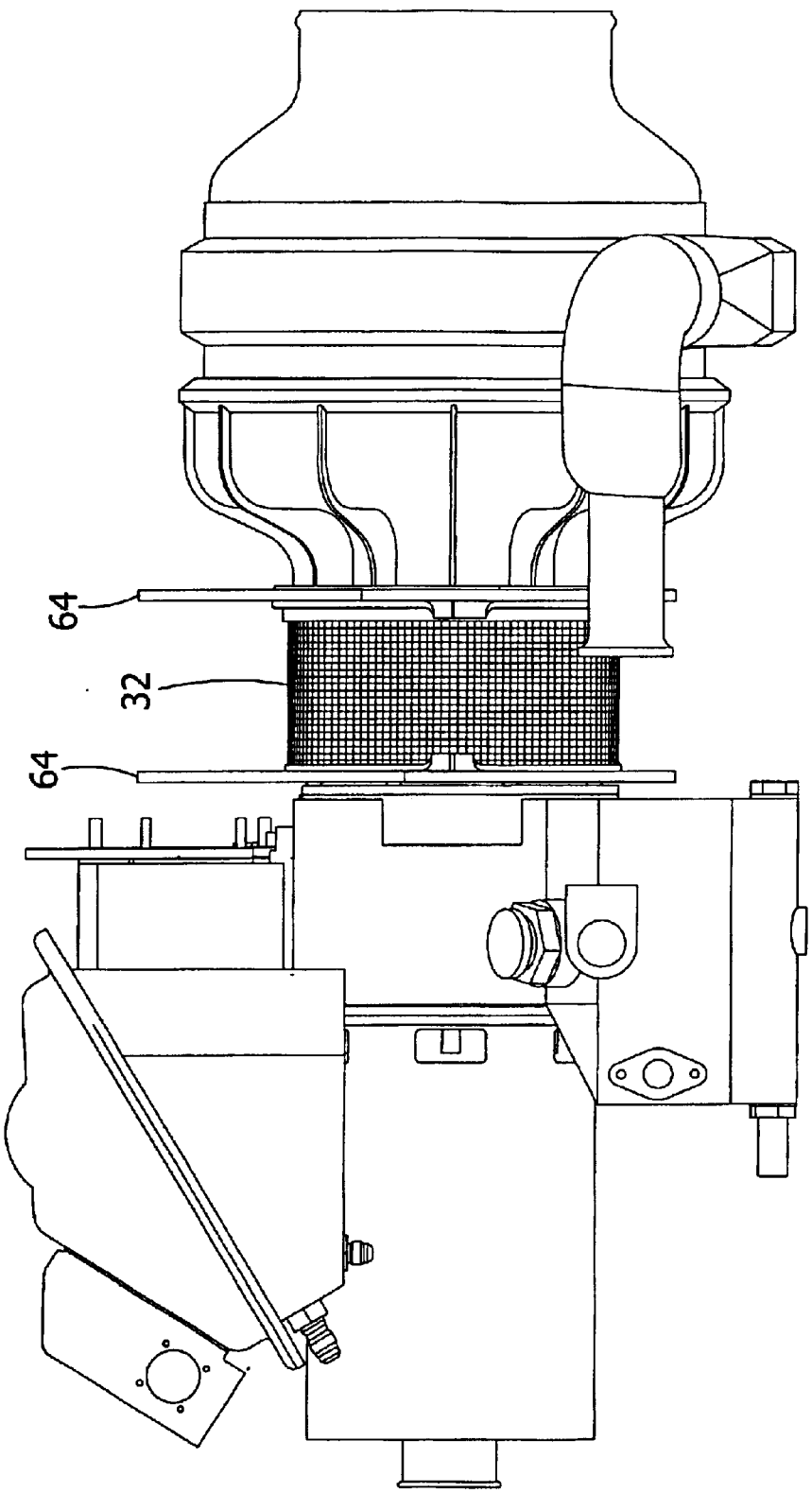
FIG. 11 is an elevation similar to FIG. 10 with the mount attached to the APU.
Figure 12:
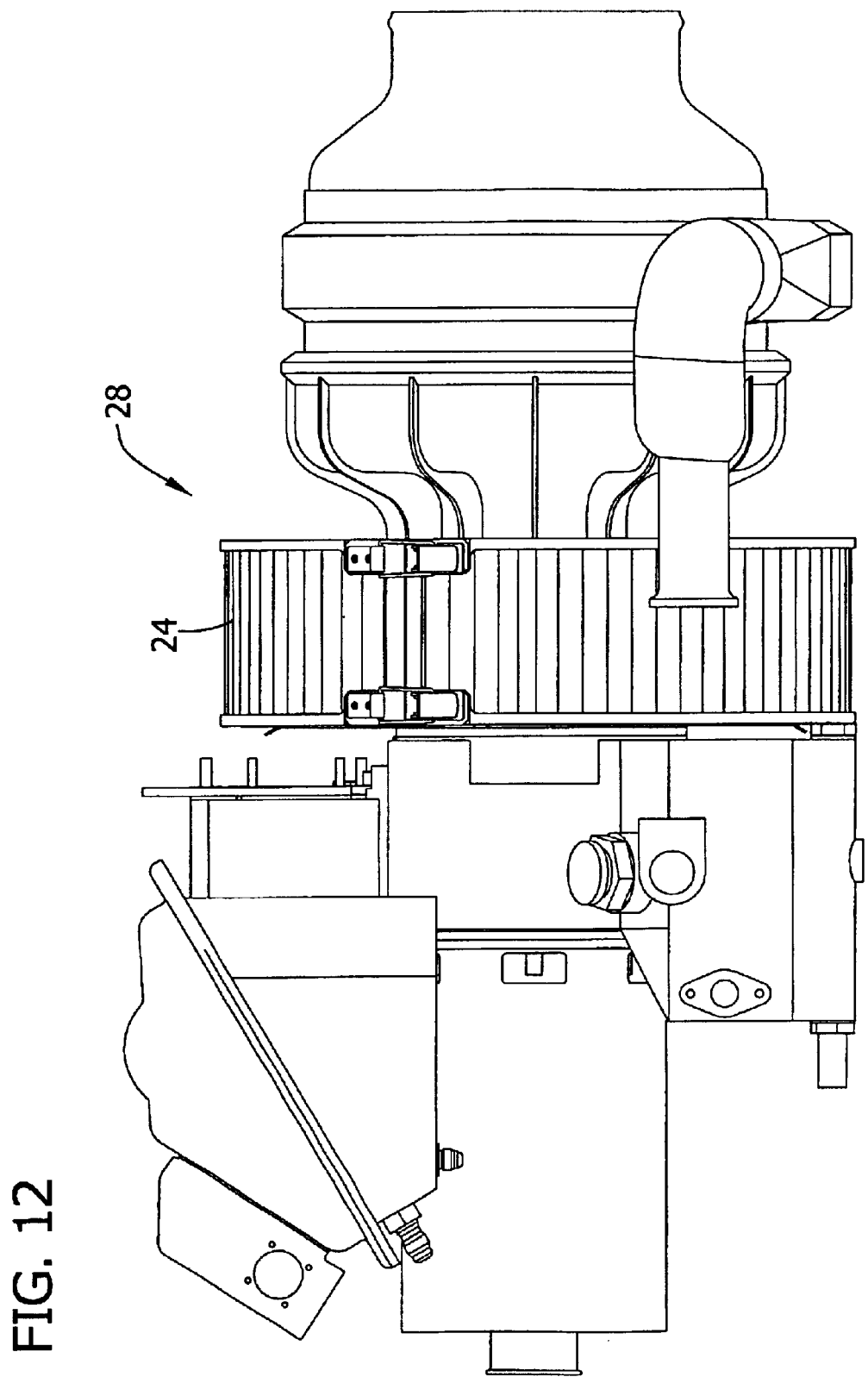
FIG. 12 is an elevation similar to FIG. 11 with the filter mounted at the installed position.

Attachment of the system 20 of the present invention to an APU 28 is shown in FIGS. 11 and 12. First, the plates 64 are secured to the end walls 34 (FIG. 10) of the APU adjacent the screened inlet 32. The attachment flanges 70 of top and bottom halves of each plate 64 are aligned in registration and one or two fasteners 72 are inserted to tighten the plates in a clamping action (see FIG. 5) until an airtight seal forms between the inner edges and end walls 34. FIG. 11 shows the APU 28 at an intermediate state with the plates 64 attached and prior to mounting the filter 24. One or more retaining devices (not shown) may be connected between each plate 64 and the engine 26 to prevent clocking, or rotation, of the plate relative to the engine. Although they could be removed, the plates 64 are intended to be generally permanently installed on the APU. Next, the filter 24 is placed on the mount 22 (FIG. 12) with its inner rim 52 in airtight engagement with the outer edge of the plates 64.

The two-piece construction of the filter 24 provides for easy installation and removal. Because the APU 28 is typically located in an aircraft cavity of limited volume, access to its side which is away from the cavity access door, typically a lower side of the APU, is difficult. It is highly desirable to avoid removing the APU from the cavity when installing or removing the filter. The present invention permits installation while the APU 28 remains in place by its construction in two identical, semicircular filter halves 46. One of the filter halves 46 is placed on top of the plates 64 in position extending between the plates. The filter half 46 is moved to the lower side of the APU by sliding it along the outer edges of the plates 64. The second half filter 46 is then placed on top of the plates 64, and the two filter halves are connected by using the fasteners 56. For cleaning or replacement, the filter 24 can be removed by unlatching the halves 46, lifting off the top filter half and rotating the lower filter half to the top for removal.

Figure 6:
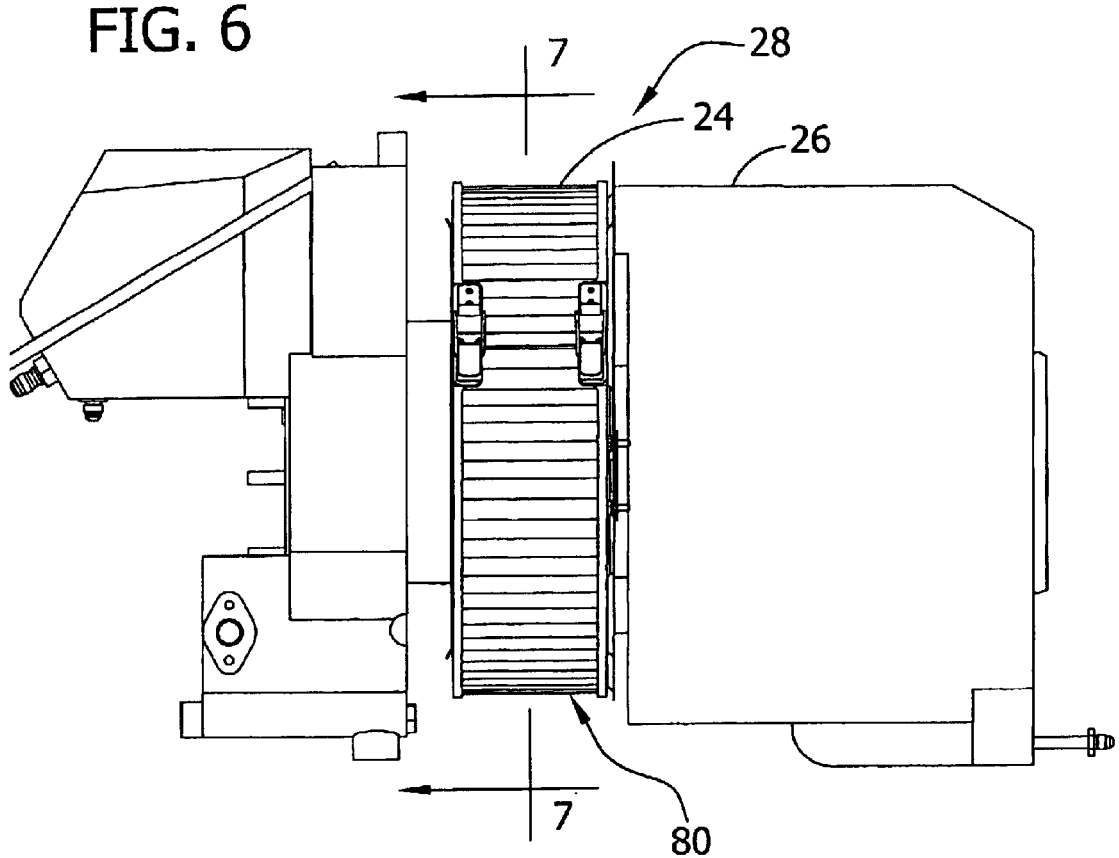
FIG. 6 is an elevation of a second embodiment of the invention.
Figure 7:
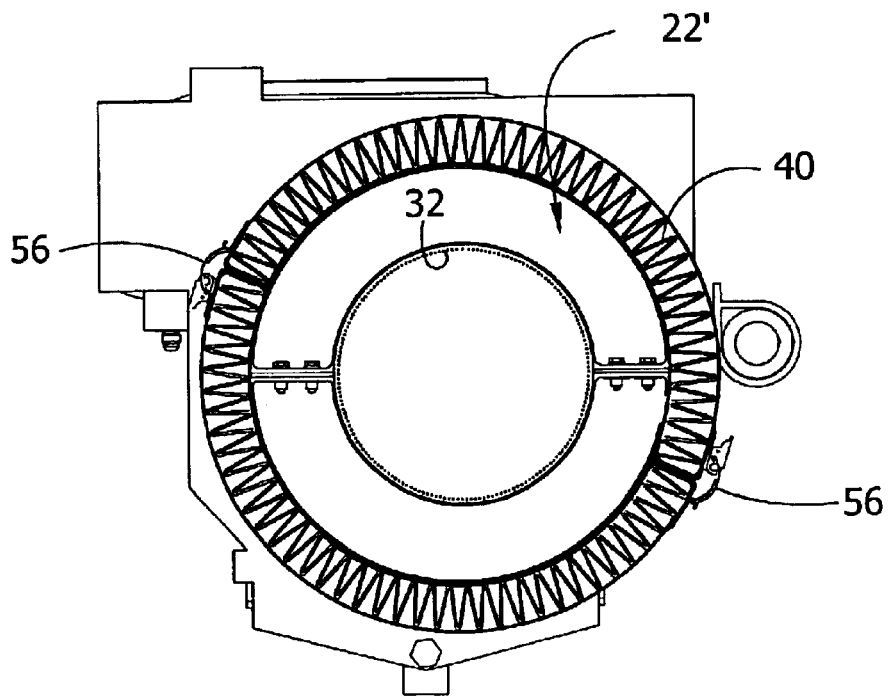
FIG. 7 is a section taken on line 7—7 of FIG. 6.

As shown in FIGS. 1 and 2, the longitudinal axis 42 of the filter is offset from the longitudinal axis 44 of the engine. The first and second plates 64 are configured such that at the installed position, the filter 24 is held at that offset relative position. Typical APUs 28 have objects (not shown) near the inlet 32, such as fuel lines, gear box, wire bundles, oil pump and igniter box, which form obstructions to the installation of a filter. The various APU designs feature varying locations for these obstructions. The design of the plates 64 may be varied as needed so that initial installation of the filter 24 requires minimal relocation of these objects. For example, the vertical or horizontal relative offset may be varied. As shown in FIGS. 6 and 7, a second embodiment 80 of the invention includes a mount 22' featuring zero offset, with the axes of the filter and engine inlet being aligned.

Figure 8:
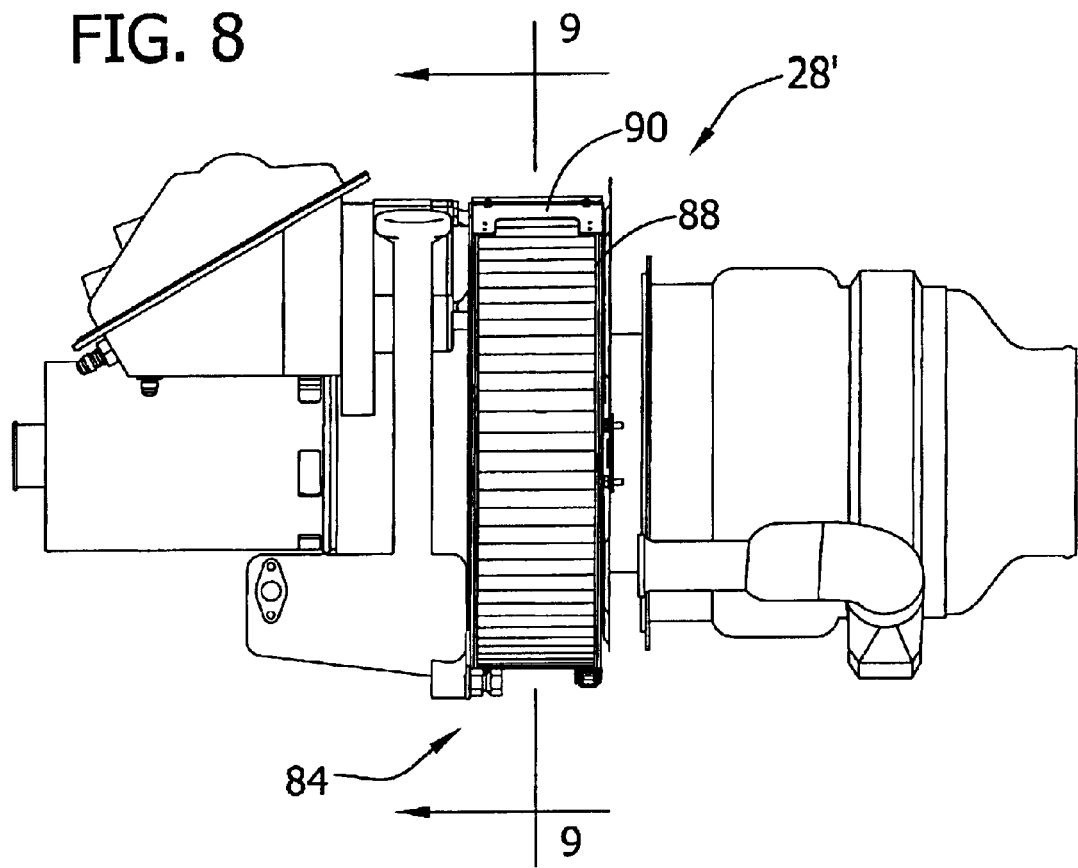
FIG. 8 is an elevation of a third embodiment of the invention.
Figure 9:
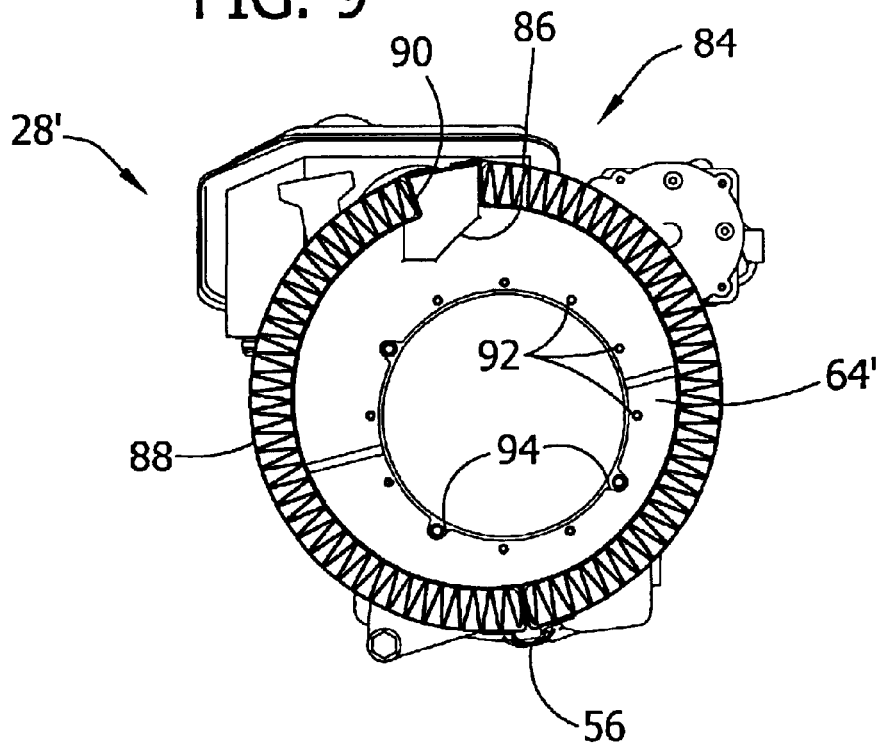
FIG. 9 is a section taken on line 9—9 of FIG. 8.

A third embodiment 84 of the invention is shown in FIGS. 8 and 9. The third embodiment is primarily intended for APUs 28' which have an obstruction 86 which is not readily avoided by offset positioning of a filter from the engine 26. Accordingly, a filter 88 is designed to seal around the obstruction. The filter 88 has a circumferential extent less than an entire 360 degrees. An end 90 of each filter half is attachable with fasteners (not shown), such as bolts, to the obstruction 86. One set of fasteners 56 is placed on the end of the filter opposite the obstruction 86.

The third embodiment 84 also shows an alternate attachment between the plates 64 and the APU 28'. For APUs which have insufficient space or a design which will not readily receive the plates by clamping around the engine. One of the plates 64 is secured to an end wall or other part of the APU by fasteners (FIG. 9) such as screws 92 extending through holes in the faces of the plates. The plates 64' have notches 94 along the inner edge to avoid interference with any protruding bolts or other features which may be present on the APU 28'. The notches 94 may be positioned as needed on the plates, and could be holes not along the inner edge. Sealing may be accomplished with a suitable quick-drying sealant material.

The air induction system 20 of the present invention may be used with an air filter restriction indicating device (not shown) which is mountable adjacent the filter for indicating whether the filter is filled with dust or other contaminants such that it requires cleaning or replacement. Such a device, as disclosed in U.S. Pat. Nos. 4,369,728 and 4,445,456, typically has a flexible diaphragm responsive to differential pressure across the filter.

Thus, the present invention provides advantages in that the filter is configured to facilitate clearance from the various components in an existing APU, providing flexibility for avoiding obstructions. The mount for the filter may be adapted for various geometries so that the filter may be readily installed and removed, even when the APU is located in a small cavity aboard an aircraft.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. An air induction system for an engine to receive intake air from a region generally surrounding the engine, remove contaminants from the intake air, and provide the intake air for delivery to the engine, the engine including a housing having an outer peripheral surface and a longitudinal axis, the system comprising:
a filter formed of a filter media arranged in a generally annular shape for placement around a portion of the engine to receive intake air from said region generally surrounding the engine in a flow direction which is generally radially inward; and
a filter mount engageable with the outer surface of the engine and configured for supporting the filter at an installed position wherein the filter is in spaced relation from the outer surface of the engine, the mount having an inner edge shaped and sized for sealingly engaging the engine and having an outer edge configured for sealingly engaging and supporting the filter;
wherein said outer edge of the mount comprises an annular engagement surface facing generally radially outward and opposite said flow direction, such that the flow of intake air presses the filter against said outer edge for improved sealing.

2. An air induction system as set forth in claim 1 wherein the filter comprises a first filter element and a second filter element, each filter element being generally semicircular in shape.

3. An air induction system as set forth in claim 2 wherein the first filter element and second filter element are adapted for interconnection to form an annulus, the filter elements having substantially the same construction and being interchangeably usable in the system.

4. An air induction system as set forth in claim 3 further comprising interengageable fasteners on the first filter element and second filter element, the filter elements being engageable with the mount and securable at the installed position with said fasteners between the filter elements, and being free from fixed attachment to the mount or the engine, thereby facilitating rapid installation and removal.

5. An air induction system as set forth in claim 4 wherein the fasteners comprise latch clips.

6. An air induction system as set forth in claim 1 wherein the mount comprises first and second plates attachable to the engine in relative spaced relation, and wherein at the installed position the filter spans the first and second plates.

7. An air induction system as set forth in claim 6 wherein the filter has a central axis, and the first and second plates are configured such that at the installed position, the axis of the filter is aligned with the axis of the engine.

8. An air induction system as set forth in claim 6 wherein the filter has a central axis, and the first and second plates are configured such that at the installed position, the axis of the filter is parallel with and offset from the axis of the engine.

9. An air induction system as set forth in claim 6 wherein said inner edge of each of the first and second plates conforms to a contour of the outer surface of the engine and forms a generally airtight seal thereagainst, and said outer edge of each of the first and second plates has a semicircular contour configured for forming a generally airtight seal when engaged by the filter.

10. An air induction system as set forth in claim 1 further comprising a first annular seal attached to said inner edge of the mount and extending along said inner edge to provide an airtight engagement between said inner edge of the mount and the engine, and a second annular seal extending along said outer edge of the mount to provide an airtight engagement between said outer edge and the filter.

11. An air induction system as set forth in claim 1 wherein said inner edge of the mount comprises an annular engagement surface facing generally radially inward and aligned with said flow direction, such that the flow of intake air pressing the filter against said mount further presses the inner edge of the mount against the outer surface of the engine for improved sealing.

12. An air induction system for an engine to receive intake air from a region generally surrounding the engine, remove contaminants from the intake air, and provide the intake air for delivery to the engine, the engine including a housing having an outer peripheral surface, the system comprising:
a filter formed of a filter media arranged in a generally annular shape for placement around a portion of the engine to receive intake air from said region generally surrounding the engine; and
a filter mount engageable with the outer surface of the engine and configured for supporting the filter at an installed position wherein the filter is in spaced relation from the outer surface of the engine, the mount having an inner edge shaped and sized for sealingly engaging the engine and having an outer edge configured for sealingly engaging and supporting the filter;
wherein the filter comprises a first filter element and a second filter element, each filter element being generally semicircular in shape and having a semicircular frame supporting the filter media, the system further comprising fasteners for attaching the frame of the first filter element to the frame of the second filter element.

13. In combination, an engine with an air induction system for protecting the engine from contaminant particles and which is readily installed or removed for facilitating rapid replacement such as for maintenance, the combination comprising:
an engine having a housing with an outer surface and a generally cylindric inlet;
a filter formed of a filter media arranged in a generally annular shape for placement around the inlet to receive intake air from said region generally surrounding the engine, the filter comprising at least two separable filter units; and
a filter mount engageable with the engine and configured for supporting the filter at an installed position wherein the filter is spaced from the inlet, the mount having an inner edge shaped and sized for sealingly engaging the outer surface and having an outer edge configured for sealingly engaging and supporting the filter.

14. A combination as set forth in claim 13 wherein the mount comprises first and second plates attachable to the engine in relative spaced relation, and wherein at the installed position the filter spans the first and second plates.

15. A combination as set forth in claim 14 wherein the engine has a longitudinal axis, the filter has a central axis, and the first and second plates are configured such that at the installed position, the axis of the filter is aligned with the axis of the engine.

16. A combination as set forth in claim 14 wherein the engine has a longitudinal axis, the filter has a central axis, and the first and second plates are configured such that at the installed position, the axis of the filter is parallel with and offset from the axis of the engine.

17. An air induction system for an engine to receive intake air from a region generally surrounding the engine, remove contaminants from the intake air, and provide the intake air for delivery to the engine, the engine including a housing having an outer peripheral surface, the system comprising:

a filter formed of a filter media arranged in a generally annular shape for placement around a portion of the engine to receive intake air from said region generally surrounding the engine; and a filter mount engageable with the outer surface of the engine and configured for supporting the filter at an installed position wherein the filter is in spaced relation from the outer surface of the engine, the mount having an inner edge shaped and sized for sealingly engaging the engine and having an outer edge configured for sealingly engaging and supporting the filter;

wherein the mount comprises first and second plates attachable to the engine in relative spaced relation, said inner edge of the mount including inner edges of the first and second plates which each conform to a contour of the outer surface of the engine and are adapted to form a generally airtight seal thereagainst, and said outer edge of the mount including outer edges of the first and second plates which each have a contour configured for forming a generally airtight seal when engaged by the filter.

* * * * *